United States Patent [19]
Kato et al.

[11] Patent Number: 5,386,275
[45] Date of Patent: Jan. 31, 1995

[54] FLUID-FILLED ELASTIC MOUNT HAVING OSCILLATING PLATE DRIVEN BY ELECTROMAGNETIC MEANS INCLUDING MAGNET FIXED TO MOVABLE INNER YOKE MEMBER, AND ANNULAR COIL FIXED TO STATIONARY OUTER YOKE MEMBER

[75] Inventors: Rentaro Kato, Kasugai; Masahiko Nagasawa, Kani, both of Japan

[73] Assignee: Tokai Rubber Industries, Ltd., Japan

[21] Appl. No.: 125,228

[22] Filed: Sep. 23, 1993

[30] Foreign Application Priority Data

Sep. 30, 1992 [JP] Japan .................. 4-286809

[51] Int. Cl.6 ............... H01F 1/00; F16M 1/00
[52] U.S. Cl. ................ 335/219; 267/140.12; 267/140.15
[58] Field of Search .......... 267/140.12, 140.15, 267/219, 140.11, 140.14; 335/219

[56] References Cited

U.S. PATENT DOCUMENTS

| | | | |
|---|---|---|---|
| 4,693,455 | 9/1987 | Andra | 267/140.1 |
| 4,941,649 | 7/1990 | Funahashi | 267/140.1 |
| 5,029,825 | 7/1991 | Doi | 267/140.1 |
| 5,076,550 | 12/1991 | Mayama | 267/140.1 |
| 5,098,072 | 3/1992 | Muramatsu | 267/140.1 |
| 5,261,649 | 11/1993 | Kato | 267/140.12 |
| 5,277,409 | 1/1994 | Goto | 267/140.14 |

FOREIGN PATENT DOCUMENTS

| | | |
|---|---|---|
| 59-1828 | 1/1984 | Japan . |
| 59-1829 | 1/1984 | Japan . |
| 60-08540 | 1/1985 | Japan . |
| 0089044 | 4/1991 | Japan .................. 267/219 |
| 3144133 | 6/1991 | Japan . |
| 3-73741 | 7/1991 | Japan . |

*Primary Examiner*—Leo P. Picard
*Assistant Examiner*—Stephen T. Ryan
*Attorney, Agent, or Firm*—Parkhurst, Wendel & Rossi

[57] ABSTRACT

A fluid-filled elastic mount including an elastic body which elastically connects inner and outer support members and partially defines a fluid chamber, an oscillating plate partially defining the fluid chamber and supported by the inner support member, and an electromagnetic drive device having an inner yoke member fixed to the oscillating plate, an annular outer yoke member fixed to the outer support member, a moving permanent magnet fixed to the inner yoke member and cooperating with the yoke members to define a closed magnetic circuit, and an annular stationary coil which is disposed in an annular magnetic gap in the closed magnetic circuit and which is fixed to the outer yoke member, so that the moving permanent magnet is displaced together with the inner yoke member to thereby oscillate the oscillating plate upon energization of the annular stationary coil, while heat generated by the coil is dissipated through the outer yoke.

14 Claims, 1 Drawing Sheet

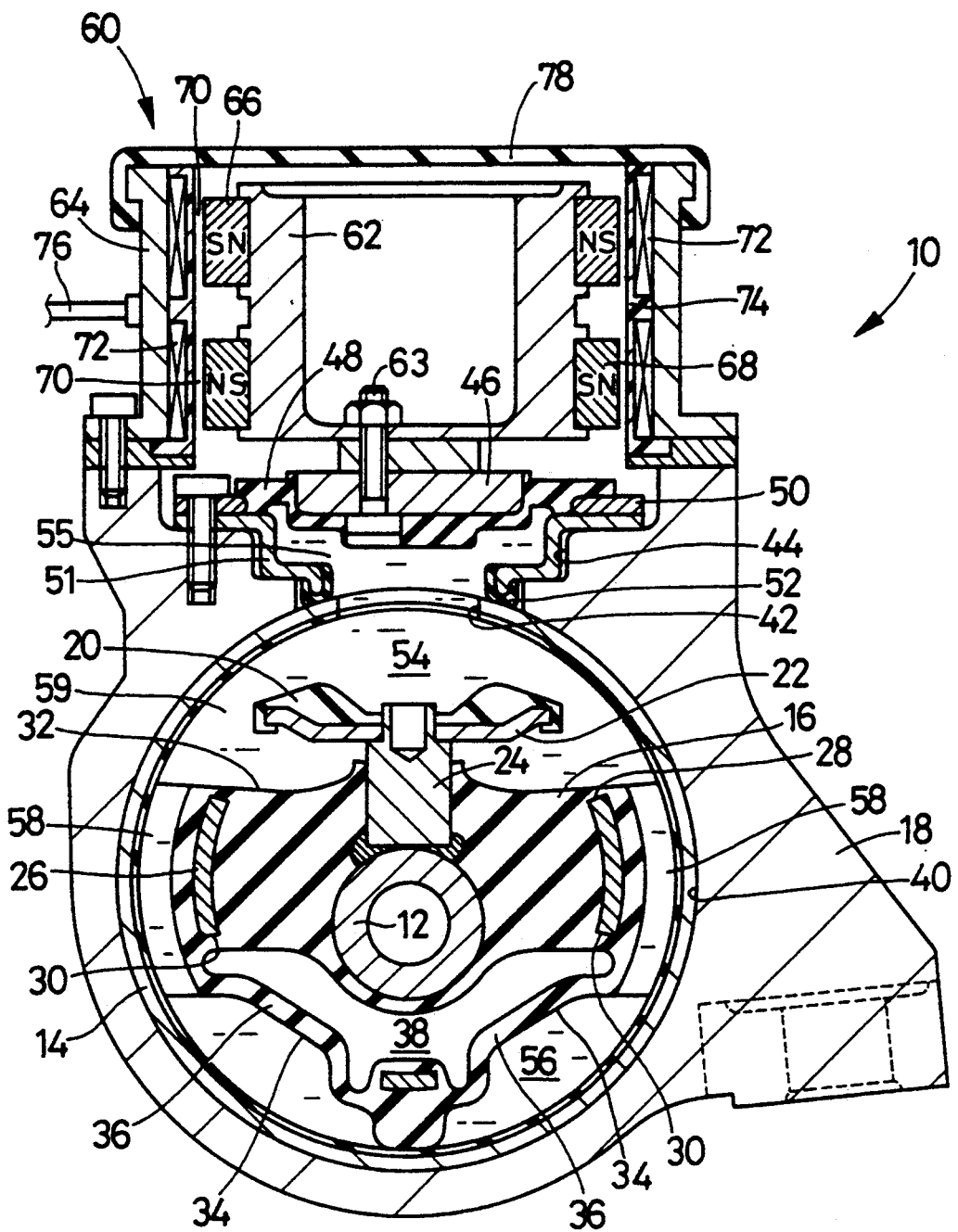

FLUID-FILLED ELASTIC MOUNT HAVING OSCILLATING PLATE DRIVEN BY ELECTROMAGNETIC MEANS INCLUDING MAGNET FIXED TO MOVABLE INNER YOKE MEMBER, AND ANNULAR COIL FIXED TO STATIONARY OUTER YOKE MEMBER

BACKGROUND OF THE INVENTION

1. Field of the Invention

The present invention relates in general to a fluid-filled elastic mount such as an engine mount for a motor vehicle, and more particularly to such a fluid-filled elastic mount whose vibration damping and isolating characteristics can be controlled by a control signal received from an external controller.

2. Discussion of the Related Art

As a vibration damping/isolating device interposed between two members of a vibration system, there is known an elastic mount in which a first and a second support member fixed to the respective members of the vibration system are elastically or flexibly connected to each other by an elastic body interposed between the two support members. For instance, such an elastic mount is used as an engine mount for mounting a power unit of an automotive vehicle on the body of the vehicle in a vibration damping fashion. In this case, one of the first and second support members of the engine mount is fixed to the vehicle body, while the other support member is fixed to the power unit which includes an engine.

Recent developments to provide a damping/isolating device with enhanced and sophisticated operating characteristics include various types of fluid-filled elastic mounts having a fluid chamber which is partially defined by an elastic body and filled with a non-compressible fluid. Various proposals have been made to control the vibration damping and isolating characteristics of such fluid-filled elastic mounts, by controlling the fluid pressure within the fluid chamber upon application of vibrations, depending upon the specific kind of the applied vibration.

Examples of the fluid-filled elastic mount according to those proposals are disclosed in laid-open Publications JP-A-59-1828 and JP-A-59-1829 of Japanese Patent Applications. In these examples, the fluid chamber is partially defined by an elastic body, and an oscillating plate which is oscillated by an electromagnetic force to control the fluid pressure within the fluid chamber, to thereby control the vibration damping and isolating characteristics of the mount depending upon the types of the input vibrations.

In the known fluid-filled elastic mounts as disclosed in the above-identified publications, an electromagnetic force to drive the oscillating plate is produced by an electromagnetic drive device which uses a permanent magnet and a coil. In this electromagnetic drive device, the magnetic circuit or path formed by the permanent magnet is open, and the region in which the coil is disposed has an insufficient magnetic flux density.

Thus, the conventional electromagnetic drive device is not capable of producing an electromagnetic force sufficient to effectively actuate the oscillating plate when the vibration applied to the fluid-filled elastic mount has a relatively large amplitude and a medium or low frequency. Consequently, the fluid pressure within the fluid chamber cannot be suitably controlled to provide an effective or satisfactory damping effect with respect to such medium- or low-frequency vibrations.

Although an increase in the size of the permanent magnet permits an electromagnetic force large enough to effectively actuate the oscillating plate, this solution inevitably results in an undesirable increase in the size and weight of the electromagnetic drive device, leading to an increased cost of manufacture of the mount. In this respect, the above solution is not feasible.

In the light of the foregoing problems, the assignee of the present application proposed a fluid-filled elastic mount having an oscillating plate which is actuated by an improved electromagnetic drive device as disclosed in pending related U.S. patent applications Ser. No. 07/979,934 and U.S. Pat. No. 5,261,649. In the electromagnetic drive device of the proposed mount, a closed magnetic circuit is defined by a stationary permanent magnet and yoke members connected thereto, and an annular moving coil is disposed displaceably in an annular magnetic gap in the closed magnetic circuit, so that the oscillating plate connected to the moving coil is oscillated by the displacement of the moving coil upon energization thereof.

In the fluid-filled elastic mount described above, the magnetic flux density in the annular magnetic gap in which the moving coil is disposed is sufficiently high because of the closed form of the magnetic circuit defined by the permanent magnet and the associated yoke members. This arrangement assures a sufficiently large electromagnetic force produced upon energization of the moving coil, permitting the oscillating plate to be oscillated to provide enhanced vibration damping and isolating characteristics depending upon the specific types of vibrations received.

However, a further investigation of the above electromagnetic drive device by the present applicants has revealed some drawbacks. That is, the moving coil is disposed in an enclosed space or surrounded by the associated members such as the yoke members which define the magnetic circuit. This environment tends to cause difficult dissipation of Joule heat generated by the energized coil, which may cause consequent overheating or burning of the coil, fusion of an external insulator of the coil, consequent short-circuiting of the coil, and disconnection of the lead wires connected to the coil.

Another drawback of the electromagnetic drive device constructed as described above arises from the displacement of the moving coil with the oscillating plate. Namely, repeated movements of the coil occur with repeated movements of the lead wires connected to the coil, and frictional contact of the lead wires with the neighboring members such as the yoke members. Thus, the electromagnetic drive device has some risk of failure due to disconnection of the lead wires.

SUMMARY OF THE INVENTION

It is therefore an object of the present invention to provide an improved fluid-filled elastic mount of a type wherein an annular gap accommodating a coil is formed in a closed magnetic circuit to assure a sufficient electromagnetic force for driving the oscillating plate, and which assures efficient dissipation of Joule heat generated by the energized coil, freedom of the coil from thermal drawbacks such as short-circuiting, and freedom of the lead wires of the coil from troubles such as disconnection due to their contact with the neighboring members.

The above object may be attained according to the principle of the present invention, which provides a fluid-filled elastic mount comprising: a first and a second support member which are spaced apart from each other by a predetermined distance; an elastic body interposed between the first and second support members and elastically connecting the first and second support members, the elastic body partially defining a fluid chamber filled with a non-compressible fluid; an oscillating plate partially defining the fluid chamber and supported by the second support member such that the oscillating plate is displaceable to control a pressure of the fluid in the fluid chamber and thereby change vibration damping and isolating characteristics of the elastic mount; and an electromagnetic drive device including (a) an inner yoke member fixed to one of opposite sides of the oscillating plate remote from the fluid chamber, (b) an annular outer yoke member disposed radially outwardly of the inner yoke member and fixed to the second support member, (c) at least one moving permanent magnet fixed to the inner yoke member, cooperating with the inner and outer yoke members to define a closed magnetic circuit, and cooperating with the outer yoke member to define an annular magnetic gap in the closed magnetic circuit, and (d) at least one annular stationary coil disposed in the annular magnetic gap and fixed to the annular outer yoke member, so that each moving permanent magnet is displaced in an axial direction of the annular magnetic gap together with the inner yoke member to thereby oscillate the oscillating plate upon energization of the at least one annular stationary coil.

In the fluid-filled elastic mount of the present invention constructed as described above, the annular magnetic gap in which each annular stationary coil is accommodated has a sufficiently high magnetic flux density owing to the closed arrangement of the magnetic circuit in which the annular magnetic gap is formed. Accordingly, the electromagnetic drive device is capable of producing a sufficiently large electromagnetic force and thereby effectively activating the oscillating plate. Further, the attachment of the annular coil to the annular outer yoke member permits efficient and easy dissipation of Joule heat generated by the energized coil, into the ambient atmosphere through the outer yoke member, whereby the coil is effectively protected against overheating due to the Joule heat, and thermal troubles such as short-circuiting due to the fusion of an insulator of the coil.

Further, the efficient dissipation of heat from the coil and a resulting low tendency of a temperature rise of the coil enables the coil to be energized with a relatively large amount of electric current. This means an accordingly large electromagnetic force produced to activate the oscillating plate. The efficient heat dissipation from the coil also means a reduced amount of heat transferred from the coil to the permanent magnet, and an accordingly reduced rise of the operating temperature of the magnet. This means a reduced cost of the permanent magnet, since the magnet may be formed of a comparatively inexpensive material having a relatively low degree of heat resistance.

Moreover, the annular coil is completely free from troubles such as disconnection of the lead wires due to repeated movement and contact with the neighboring members, since the coil is stationary and non-displaceable, namely, fixed to the outer yoke member fixed to the stationary second support member of the mount.

BRIEF DESCRIPTION OF THE DRAWING

The above and other objects, features and advantages of the present invention will become more apparent by reading the following detailed description of a presently preferred embodiment of the invention, when considered in connection with the accompanying drawing, in which the single figure is an elevational view in cross section of a fluid-filled elastic mount in the form of an engine mount constructed according to one embodiment of this invention.

DETAILED DESCRIPTION OF THE PREFERRED EMBODIMENT

Referring to the single figure, there is shown one embodiment of a fluid-filled elastic mount of the present invention in the form of an engine mount 10 for a motor vehicle. The engine mount 10 has an inner sleeve 12 and an outer sleeve 14 which are radially spaced apart from each other by a predetermined radial distance. These inner and outer sleeves 12, 14, which are made of a metal, are elastically connected to each other by an elastic body 16 interposed therebetween. The outer sleeve 14 is fixedly received in a bore formed in a mounting bracket 18. The engine mount 10 is used to mount a power unit including an engine of the vehicle, on the body of the vehicle in a vibration damping fashion, such that the inner sleeve 12 is secured to the vehicle body, while the outer sleeve 14 is secured to the power unit through the bracket 18.

It will be understood that the inner sleeve 12 serves as a first support member through which the engine mount 10 is secured to the vehicle body, while the outer sleeve 14 and the bracket 18 serve as a second support member through which the engine mount 10 is secured to the power unit.

Before the engine mount 10 is installed on the vehicle, the axis of the inner sleeve 12 is offset by a given distance from the axis of the outer sleeve in the downward direction, as indicated in the figure. When the engine mount 10 is installed on the vehicle, the static load (weight) of the power unit acts on the outer sleeve 14 (bracket 18), whereby the elastic body 16 undergoes elastic deformation, whereby the outer sleeve 14 is brought into substantially coaxial or concentric relationship with the inner sleeve 12. In this condition, the engine mount 10 operates to damp a dynamic vibrational load, which is received primarily in the vertical direction in which the inner and outer sleeves 12, 14 are initially offset from each other as described above.

The inner sleeve 12 has a relatively large cylindrical wall thickness, and has a support member 24 fixed by welding to an axially intermediate portion thereof. The support member 24 extends in a radially outward direction, namely, in the upward direction perpendicular to the axial direction of the inner sleeve 12. The support member 24 carries a wing member 22 fixed at its upper end such that the wing member 22 lies substantially in a plane perpendicular to the direction of extension of the support member 24. The wing member 22 is covered at its upper or outer surface by a buffer layer 20 which is made of a rubbery material and has a suitable thickness.

Radially outwardly of the inner sleeve 12, there is disposed an intermediate sleeve 26 also made of a metal. This intermediate sleeve 26 has a smaller cylindrical wall thickness than the inner sleeve 12, and is radially offset with respect to the inner sleeve 12 in the direction of extension of the support member 24 from the inner sleeve 12. With the inner and intermediate sleeves 12, 26 thus positioned relative to each other within a suitable mold, the elastic body 16 is formed by a vulcanization process well known in the art, so as to elastically connect the inner and intermediate sleeves 12, 26. The elastic body 16 has a generally cylindrical shape having a large wall thickness corresponding to the radial distance between the inner and intermediate sleeves 12, 26. Thus, an integral structure is constituted by the inner and intermediate sleeves 12, 26 and the elastic body 16 bonded to the sleeves 12, 26 by means of vulcanization.

The intermediate sleeve 26 has a first window 28 formed in one of diametrically opposite circumferential portions which corresponds to the circumferential position of the inner sleeve 12 at which the support member 24 is fixed. The first window 28 has a circumferential length slightly smaller than a half of the entire circumference of the intermediate sleeve 26. In the other circumferential portion of the intermediate sleeve 26 opposite to the first window 28, there are formed a pair of second windows 30, 30, each of which has a circumferential length slightly smaller than a quarter of the entire circumference of the sleeve 26. These first and second windows 28, 30 are provided in an axially intermediate portion of the sleeve 26.

The elastic body 16 has a first recess or pocket 32 open in its outer circumferential surface through the first window 28 of the intermediate sleeve 26, and also a pair of second recesses or pockets 34, 34 open in its outer circumferential surface through the respective second windows 30, 30. Since the recesses 32, 34 are open through the windows 28, 30, these recesses 32, 34 are located in an axially intermediate portion of the elastic body 16.

Within the first recess 32, the wing member 22 is positioned while being spaced from the bottom of the recess 32 by a given distance in the radial direction of the inner sleeve 12, so that the interior space of the first recess 32 is substantially divided by the wing member 22 into a radially inner and a radially outer section. The elastic body 16 has an axial void 38 formed therethrough so as to extend in its axial direction. The axial void 38 is located between the inner sleeve 12 and the bottom of the second recesses 34, such that the axial void 38 defines a pair of thin-walled portions in the form of flexible diaphragms 36, 36, which in turn provide the bottom of each second recess 34.

The outer sleeve 14 is press-fitted on the integral structure consisting of the thus constructed inner and intermediate sleeves 12, 26 and the elastic body 16, such that the inner circumferential surface of the outer sleeve 14 is fluid-tightly fitted on the outer circumferential surface of the intermediate sleeve 26, which surface is covered by an elastomeric layer formed integrally with the elastic body 16. The thus prepared assembly consisting of the components 12, 14, 16, 26 is fixedly received in a bore 40 of the mounting bracket 18.

The bracket 18 has an aperture 44 communicating with the bore 40. The aperture 44 is open in an outer surface of the bracket 18, and is positioned so that the aperture 44 is aligned with a through-hole 42 formed through the cylindrical wall of the outer sleeve 14, when the assembly 12, 14, 16, 26 is received in the bore 40 in its predetermined circumferential position relative to the bracket 18, that is, such that the through-hole 42 communicates with the first recess 32. The outer sleeve 14 of the assembly thus positioned in the bore 40 closes the first and second recesses 32, 34 of the elastic body 16, except a circumferential portion of the first recess 32 corresponding to the through-hole 42 and aperture 44.

A substantially planar oscillating plate 46 is attached to the outer surface of the mounting bracket 18 in which the aperture 44 is open. Described more specifically, the oscillating plate 46 is attached to the bracket 18 through an annular elastic support 48 bonded to the oscillating plate 46, and a retaining ring 50 which is bonded to the elastic support 48 and bolted to a portion of the bracket 18 near the opening of the aperture 44. The retaining ring 50 is positioned relative to the bracket 18 so that the annular elastic support 48 elastically supporting the plate 46 closes the opening of the aperture 44. Thus, the oscillating plate 46 is supported by the bracket 18, so as to be displaceable toward and away from the through-hole 42 of the outer sleeve 14, owing to the elastic property of the annular elastic support 48.

A stepped cylindrical sealing metal member 51 is disposed within the aperture 44 and bolted to the bracket 18 together with the retaining ring 50. A sealing rubber member 52 is squeezed by and between the sealing metal member 51 and the outer circumferential surface of the outer sleeve 14, so as to secure fluid tightness between the aperture 44 of the bracket 18 and the through-hole 42 of the outer sleeve 14.

In the present engine mount 10 wherein the outer sleeve 14 is fitted in the bore 40 of the bracket 18 while the oscillating plate 46 and the sealing metal member 51 are bolted to the bracket 18, as described above, the elastic body 16 having the first recess 32 cooperates with the outer sleeve 14 to define a pressure-receiving chamber 54, while the bracket 18 having the aperture 44 and the sealing metal member 51 cooperates with the oscillating plate 46 and the annular elastic support 48 to define an auxiliary chamber 55 which communicates with the pressure-receiving chamber 54 through the through-hole 42. The elastic body 16 having the flexible diaphragms 36 (second recesses 34) cooperates with the outer sleeve 14 to further define an equilibrium chamber 56 communicating with the pressure-receiving chamber 54 through a pair of orifice passages 58, 58. These pressure-receiving chamber 54, auxiliary chamber 55 and equilibrium chamber 56 constitute a fluid chamber filled with a non-compressible fluid. Upon application of a dynamic vibrational load to the engine mount 10, the pressure of the fluid within the pressure-receiving and auxiliary chambers 54, 55 is changed due to elastic deformation of the elastic body 16, while a change in the fluid pressure in the equilibrium chamber 56 is substantially prevented by easy displacement of the flexible diaphragms 36, in other words, by a change in the volumes of the equilibrium chamber 56 which is permitted by the displacement of the diaphragms 36.

The orifice passages 58 are formed through the elastomeric layers between the intermediate and outer sleeves 26, 14, so as to extend in the circumferential direction of the sleeves. These orifice passages 58 permit flows of the fluid between the pressure-receiving and equilibrium chambers 54, 56, due to a pressure change of the fluid in the pressure-receiving and auxiliary chambers 54, 55. Vibrations in a given frequency range applied to the engine mount 10 are damped based resonance of the fluid flowing through the orifice passages 58, in a manner well known in the art.

The wing member 22 is disposed in the pressure-receiving chamber 54 such that the radial distance from the inner sleeve 12 in the direction of extension of the support member 24 is about a half of the radial spacing between the inner and outer sleeves 12, 14 in the same radial direction. The periphery of the thus positioned wing member 22 cooperates with the inner circumferential surface of the outer sleeve 14 to define a generally annular resonance portion or restricted fluid passage indicated at 59 in the figure. This restricted fluid passage 59 permits a restricted flow of the fluid between the radially inner and outer sections of the pressure-receiving chamber 54, which are substantially separated from each other by the wing member 22. Vibrations in a certain frequency range applied to the engine mount 10 are isolated based on resonance of the fluid flowing through the restricted fluid passage 59.

In the present embodiment, the orifice passages 58 are tuned to provide an intended damping effect with respect to low-frequency vibrations such as shakes of the power unit, based on the resonance of the fluid flowing through the orifice passages 58. On the other hand, the restricted fluid passage or resonance portion 59 of the pressure-receiving chamber 54 is tuned to provide an intended isolating effect with respect to high-frequency vibrations such as booming noises, based on the resonance of the fluid flowing through the restricted fluid passage 59. For obtaining the intended vibration damping and isolating effects based on the fluid flows through the orifice passages 58 and the restricted fluid passage 59, the fluid chamber 54, 55, 56 is filled with a selected non-compressible fluid having a relatively low viscosity, such as water, alkylene glycol, polyalkylene glycol and silicone oil.

To activate or drive the oscillating plate 46 which partially defines the auxiliary chamber 55, an electromagnetic drive device generally indicated at 60 in the figure is disposed on one of opposite sides of the plate 46 remote from the auxiliary chamber 55.

The electromagnetic drive device 60 includes a movable inner yoke member 62 and a stationary outer yoke member 64 which are both made of an iron or other suitable ferromagnetic material. The inner yoke member 62 consists of a cylindrical portion and a bottom portion closing one of the opposite open ends of the cylindrical portion, while the outer yoke member 64 is an annular or cylindrical member which has a larger diameter than the inner yoke member 62 and is disposed radially outwardly of and in coaxial relationship with the inner yoke member 62. The movable inner yoke member 62 is fixed at its bottom portion to the oscillating plate 46 by fastening means including a bolt 63, while the annular yoke member 64 is bolted at an axial end thereof to the bracket 18.

The cylindrical inner yoke member 62 carries two annular permanent magnets 66, 68 secured to its outer circumferential surface, so that a predetermined radial spacing is provided between the outer circumferential surfaces of the magnets 66, 68 and the inner circumferential surface of the annular outer yoke member 64. The two permanent magnets 66, 68 are positioned near the opposite axial ends of the cylindrical portion of the inner yoke member 62, and spaced apart from each other in the axial direction. As indicated at S and N in the figure, each permanent magnet 66, 68 has opposite magnetic poles at the radially outer and inner portions.

The inner yoke member 62, outer yoke member 64 and two permanent magnets 66, 68 cooperate to define a closed magnetic circuit or path including the magnetic poles. The annular permanent magnets 66, 68 and the annular outer yoke member 64 cooperate to define an annular magnetic gap 70 in the closed magnetic circuit. The amount of this magnetic gap 70 corresponds to the above-indicated predetermined radial spacing between the outer circumferential surfaces of the magnets 66, 68 and the opposed inner circumferential surface of the outer yoke member 64.

In the annular magnetic gaps 70, 70 in the closed magnetic circuit defined by the members 62, 64, 66, 68, there are disposed a pair of annular stationary coils 72, 72 which are wound in the opposite directions and electrically connected to each other. The annular stationary coils 72, 72 are covered by a thermal insulator in the form of a resin layer 74, except at their outer circumferential surfaces at which the coils 72, 72 are secured to the outer yoke member 64. Between the inner circumferential surface of the resin layer 74 and the outer circumferential surfaces of the permanent magnets 66, 68, there is left a small clearance which facilitates axial displacements of the permanent magnets 66, 68 with the inner yoke member 62, within the annular gap 70 (within the outer yoke member 64).

The resin layer 74 used as a thermal insulator covering the coils 72 is preferably a layer of a material highly resistant to the heat generated by the energization of the coils 72. In this respect, it is desirable to use a resin having high heat-resistance and slidability. PPS (polyphenylene sulfide) is a typical example of this resin material for the resin layer 74. In the figure, reference numeral 76 denotes a lead wire cable including lead wires connected to the stationary coils 72. The lead wire cable 76 extends through the wall of the annular stationary outer yoke member 64, and is connected to an external controller. Reference numeral 78 in the figure denotes a thin protective covering closing the open end of the electromagnetic drive device 60 which is remote from the oscillating plate 64. The protective covering 78 protects the interior of the device 60 against entry of dust and any other foreign matters during use of the engine mount 10 on the motor vehicle.

In operation of the present engine mount 10 equipped with the electromagnetic drive device 60 for the oscillating plate 46, an alternating current is applied to the stationary coils 72, 72, so that the coils 72 are subject to an electromagnetic force (Lorentz force) produced according to the Fieming's left-hand rule. As a result, the movable permanent magnets 66, 68 are moved together with the inner yoke member 62, whereby the oscillating plate 64 fixed to the inner yoke member 62 is displaced in the axial direction of the inner yoke member 62. The oscillating displacement of the oscillating plate 46 can be controlled by controlling the application of the current to the coils 72, so as to control the fluid pressure within the pressure-receiving and auxiliary chambers 54, 55. Thus, the present engine mount 10 is capable of exhibiting suitably controlled operating characteristics effective to damp or isolate the specific input vibrations.

When the frequency of the input vibration is relatively low, the oscillating plate 46 is oscillated in the same phase as the input vibration, so as to positively cause a fluid pressure change in the fluid chamber 54, 55, for increasing the amount of the fluid which flows through the orifice passages 58, and thereby enhancing the damping effect based on the fluid flows through the orifice passages 58. When the frequency of the input vibration is in a medium or high band, the phase of oscillation of the oscillating plate 46 is reversed with respect to that of the input vibration, to thereby absorb the fluid pressure change in the chamber 54, 55 or reduce the amount of the fluid pressure change, so that the engine mount 10 exhibits an improving effect of isolating the medium- to low-frequency vibration.

In the electromagnetic drive device 60 of the present engine mount 10, the annular magnetic gap 70 in which the annular stationary coils 72 are disposed is provided in a closed magnetic circuit or path defined or formed by the yoke members 62, 64 and magnets 66, 68, whereby the magnetic flux density in the annular magnetic gap 70 is sufficiently high, assuring an accordingly large electromagnetic force produced to drive the oscillating plate 46 upon energization of the coils 72.

Further, the present electromagnetic drive device 60 using the stationary coils 72 fixed to the outer yoke member 64 is advantageous in that the Joule heat generated by the coils 72 can be efficiently dissipated into the ambient atmosphere, through the outer yoke member 64 made of an iron or other ferromagnetic material having high thermal conductivity. Accordingly, the amount of rise of the operating temperature of the coils 72 is effectively minimized, whereby the coils 72 are protected from burning, short-circuiting due to fusion of the covering material, disconnection of the lead wires, and any other troubles due to the heat generated by the coils.

Since the temperature rise of the coils 72 is minimized by efficient dissipation of the generated heat through the outer yoke member 64 as described above, the energization of the coils 72 may be effected by a larger amount of electric current than in the conventional device, without suffering from the thermal troubles indicated above. This makes it possible to obtain an increased electromagnetic force for driving the oscillating plate 46, without enlarging the size of the coils.

Further, the lead wire cable 76 is free from disconnection due to contact with the neighboring members, because the coils 72 to which the cable 76 is connected are held stationary, that is, fixed to the stationary outer yoke member 64 which in turn is secured to the bracket 18.

In the present engine mount 10 having means for minimizing the temperature rise of the coils 72 as described above, the amount of heat transfer from the coils 72 to the interior of the device 60 (toward the inner yoke member 62) is also minimized by the provision of the resin layer 74 which covers the radially inner surfaces of the coils 72 and which has a relatively low thermal conductivity. This arrangement effectively protects the electromagnetic drive device 60 against troubles due to the heat, such as a change in the temperature characteristic of the permanent magnets 66, 68 that causes a decrease in the electromagnetic force generated, and deterioration of the annular elastic support 48 which supports the oscillating plate 46. Further, the same arrangement has a further advantage that the permanent magnets 66, 68 may be made of a relatively inexpensive composition including neodymium or iron, in place of a relatively expensive composition including samarium or cobalt.

While the present invention has been described in detail in its presently preferred embodiment for illustrative purpose only, it is to be understood that the invention is not limited to the details of the illustrated embodiment.

While the illustrated embodiment uses the cylindrical inner yoke member 62 having an opening closed at one end, the inner yoke member 62 may be replaced by a solid member. A solid inner yoke member is desirable when the engine mount 10 has a relatively small size, for example.

In the illustrated embodiment, the two pairs of permanent magnets 66, 68 and the two pairs of coils 72 are provided at respective two axially spaced-apart positions of the inner and outer yoke members 62, 64. However, a single permanent magnet and a single coil may be provided between the inner and outer yoke members 62, 64. For instance, a permanent magnet may be located at an axially middle portion of the yoke members 62, 64.

Although the illustrated embodiment is adapted such that the two coils 72 are disposed in the respective two annular magnetic gaps 70, 70 between the respective permanent magnets 66, 68 and the outer yoke member 64, it is possible to provide more than two annular magnetic gaps. In this case, the axial lengths of the inner and outer yoke members 62, 64 may be increased as needed.

While the equilibrium chamber 56 communicating with the pressure-receiving chamber 54 through the orifice passages 58 is provided in the illustrated embodiment, the equilibrium chamber 56 and the orifice passages 58 may be eliminated.

Although the illustrated embodiment takes the form of a cylindrical fluid-filled elastic mount having the inner and outer sleeves 12, 14, the principle of the invention is equally applicable to various types of fluid-filled elastic mounts other than the cylindrical type, as disclosed in the laid-open publications identified above.

It is to be further understood that the present invention may be embodied with various other changes, modifications and improvements, which may occur to those skilled in the art, without departing from the spirit and scope of the invention defined in the following claims.

What is claimed is:

1. A fluid-filled elastic mount comprising:
 a first and a second support member which are spaced apart from each other by a predetermined distance;
 an elastic body interposed between said first and second support members and elastically connecting said first and second support members, said elastic body partially defining a fluid chamber filled with a non-compressible fluid;
 an oscillating plate partially defining said fluid chamber and supported by said second support member such that said oscillating plate is displaceable to control a pressure of said fluid in said fluid chamber and thereby change vibration damping and isolating characteristics of the elastic mount; and
 an electromagnetic drive device including (a) an inner yoke member fixed to one of opposite sides of said oscillating plate remote from said fluid chamber, (b) an annular outer yoke member disposed radially outwardly of said inner yoke member and fixed to said second support member, said annular outer yoke member being exposed to ambient atmosphere at an outer circumferential surface thereof to facilitate radiation of heat from said annular outer yoke member into the atmosphere, (c) at least one moving permanent magnet fixed to said inner yoke member, cooperating with said inner and outer yoke members to define a closed magnetic circuit, and cooperating with said outer yoke member to define an annular magnetic gap in said closed magnetic circuit, and (d) at least one annular stationary coil disposed in said annular magnetic gap and fixed to said annular outer yoke member, said at least one moving permanent magnet being displaced in an axial direction of said annular magnetic gap together with said inner yoke member to thereby oscillate said oscillating plate upon energization of said at least one annular stationary coil.

2. A fluid-filled elastic mount according to claim 1, wherein said electromagnetic drive device further comprises a resin layer which cooperates with said annular outer yoke member to enclose said at least one annular stationary coil, said resin layer being formed of a material effective to minimize an amount of heat to be transferred from said at least one annular stationary coil toward an interior of said electromagnetic drive device.

3. A fluid-filled elastic mount according to claim 1, wherein said electromagnetic drive device further comprises a lead wire cable connected to said at least one annular stationary coil and extending through said annular outer yoke member fixed to said second support member.

4. A fluid-filled elastic mount according to claim 1, wherein said at least one moving permanent magnet consists of two permanent magnets fixed to an outer circumferential surface of said inner yoke member, said two permanent magnets being spaced apart from each other in an axial direction of said inner yoke member.

5. A fluid-filled elastic mount according to claim 4, wherein said at least one annular stationary coil consists of two annular coils interposed between said annular outer yoke member and said two permanent magnets, respectively.

6. A fluid-filled elastic mount according to claim 1, wherein said fluid chamber comprises a pressure-receiving portion partially defined by said elastic member, and an auxiliary chamber portion partially defined by said oscillating plate and communicating with said pressure-receiving portion.

7. A fluid-filled elastic mount according to claim 6, wherein said first support member consists of an inner sleeve, while said second support member comprises an outer sleeve disposed radially outwardly of said inner sleeve and connected to said inner sleeve by said elastic body, said outer sleeve and said elastic body cooperating with each other to define said pressure-receiving portion of said fluid chamber.

8. A fluid-filled elastic mount according to claim 7, wherein said second support member further comprises a bracket which supports said outer sleeve, said oscillating plate and said annular outer yoke member being supported by said bracket.

9. A fluid-filled elastic mount according to claim 6, wherein said second support member comprises an outer sleeve cooperating with said elastic body to define said pressure-receiving portion of said fluid chamber, and a bracket which supports said outer sleeve and cooperates with said oscillating plate to define said auxiliary chamber portion.

10. A fluid-filled elastic mount according to claim 9, wherein said outer sleeve has a through-hole formed through a wall thickness thereof, said bracket having an aperture communicating with said pressure-receiving portion through said through-hole, said aperture cooperating with said oscillating plate to define said auxiliary chamber portion communicating with said pressure-receiving portion through said through-hole.

11. A fluid-filled elastic mount according to claim 6, wherein said fluid chamber further comprises an equilibrium portion partially defined by said elastic body, said elastic mount further comprising means for defining at least one orifice passage for fluid communication between said pressure-receiving portion and said equilibrium portion.

12. A fluid-filled elastic mount according to claim 6, further comprising a wing member disposed in said pressure-receiving portion and fixed to said first support member, said wing member substantially dividing said pressure-receiving portion into two sections and cooperating with said second support member to define a restricted fluid passage for restricted fluid communication between said two sections.

13. A fluid-filled elastic mount according to claim 1, wherein one of said first and second support members is secured to one of a body and a power unit of a motor vehicle, while the other of said first and second support members is secured to the other of said body and said power unit, said power unit including an engine of the motor vehicle.

14. A power unit mounting device for flexibly mounting a power unit of a motor vehicle on a body of the vehicle, comprising a fluid-filled elastic mount as defined in claim 1.

* * * * *